(12) United States Patent
West et al.

(10) Patent No.: US 10,027,273 B2
(45) Date of Patent: Jul. 17, 2018

(54) PLUNGER AND PUCK MOUNTING SYSTEM FOR PHOTOVOLTAIC PANELS

(71) Applicant: SolarCity Corporation, San Mateo, CA (US)

(72) Inventors: Jack West, San Rafael, CA (US); Tyrus Hudson, San Rafael, CA (US); David Molina, San Rafael, CA (US)

(73) Assignee: SolarCity Corporation, San Mateo, CA (US)

(*) Notice: Subject to any disclaimer, the term of this patent is extended or adjusted under 35 U.S.C. 154(b) by 402 days.

(21) Appl. No.: 14/701,475

(22) Filed: Apr. 30, 2015

(65) Prior Publication Data
US 2016/0322929 A1    Nov. 3, 2016

(51) Int. Cl.
*F24J 2/52*    (2006.01)
*H02S 20/23*    (2014.01)

(52) U.S. Cl.
CPC .............. *H02S 20/23* (2014.12); *F24J 2/5254* (2013.01); *Y02B 10/12* (2013.01); *Y02E 10/47* (2013.01)

(58) Field of Classification Search
CPC ........ F24J 2/5245; F24J 2/5252; F24J 2/5254; F24J 2/5256; F24J 2/5258; H02S 20/24; H02S 20/25; H02S 20/26; H02S 30/10
USPC ........................................................ 211/13.1
See application file for complete search history.

(56) References Cited

U.S. PATENT DOCUMENTS

| | | |
|---|---|---|
| 6,443,145 B1 | 9/2002 | Buron et al. |
| 7,435,134 B2 * | 10/2008 | Lenox ................... F24J 2/5245 439/567 |
| 7,758,011 B2 | 7/2010 | Haddock |
| 7,963,802 B2 | 6/2011 | Corneille et al. |
| 8,153,700 B2 | 4/2012 | Stearns et al. |

(Continued)

FOREIGN PATENT DOCUMENTS

| | | | | |
|---|---|---|---|---|
| CA | 2750522 A1 | * | 7/2010 | ............. F24J 2/5239 |
| CA | 2815290 A1 | * | 11/2013 | ............. F24J 2/5245 |

(Continued)

OTHER PUBLICATIONS

"QBase Universal Tile Mount" by Quick Mount PV, retrieved from the Internet on May 11, 2015, at http://www.quickmountpv.com/products/universal-tile-mount.html?cur=1 (8 pages).

*Primary Examiner* — Joshua E Rodden
(74) *Attorney, Agent, or Firm* — Kilpatrick Townsend & Stockton LLP

(57) ABSTRACT

A photovoltaic (PV) mounting hardware support system having a base portion. A foot has an elongated body adapted to connect to at least one PV module frame mounting component. A latch is located between the foot and the base portion and comprising first and second flexible flanges adapted to extend into fixed connection with the top portion of base portion. A plunger having first and second extensions, the plunger is located between the latch and the base portion and moveable from a first position to a second position. In the first position of the plunger, the first and second flexible flanges of the latch are not in fixed connection with the base portion. In the second position of the plunger, the first and second extensions of the plunger respectively apply forces to the first and second flexible flanges such that the first and second flexible flanges are placed into fixed connection with the base portion.

14 Claims, 7 Drawing Sheets

(56) References Cited

U.S. PATENT DOCUMENTS

| | | | |
|---|---|---|---|
| 8,181,926 B2* | 5/2012 | Magno, Jr. | F24J 2/5258 |
| | | | 248/220.21 |
| 8,794,583 B2 | 8/2014 | Poivet et al. | |
| 8,887,920 B2 | 11/2014 | Pelman et al. | |
| 9,422,957 B2* | 8/2016 | Dinh | F16B 5/0072 |
| 9,473,066 B2* | 10/2016 | Stephan | H02S 20/23 |
| 9,531,319 B2* | 12/2016 | Braunstein | H02S 20/23 |
| 2008/0302928 A1* | 12/2008 | Haddock | E04F 13/0821 |
| | | | 248/205.1 |
| 2009/0166494 A1 | 7/2009 | Bartelt-Muszynski et al. | |
| 2010/0276558 A1* | 11/2010 | Faust | F24J 2/5205 |
| | | | 248/222.14 |
| 2011/0100434 A1* | 5/2011 | Van Walraven | F24J 2/5205 |
| | | | 136/251 |
| 2012/0325761 A1 | 12/2012 | Kübsch et al. | |
| 2013/0153001 A1 | 6/2013 | Reed et al. | |
| 2013/0153004 A1 | 6/2013 | Knapp et al. | |
| 2013/0227833 A1 | 9/2013 | Rizzo | |
| 2013/0272800 A1 | 10/2013 | Kelleher | |
| 2013/0313209 A1* | 11/2013 | Barth | F24J 2/5205 |
| | | | 211/41.1 |

FOREIGN PATENT DOCUMENTS

| | | | | |
|---|---|---|---|---|
| CN | 203911856 U | | 10/2014 | |
| EP | 2410190 A1 * | | 1/2012 | F16B 7/18 |
| JP | 2011058216 A * | | 3/2011 | F24J 2/5233 |

\* cited by examiner

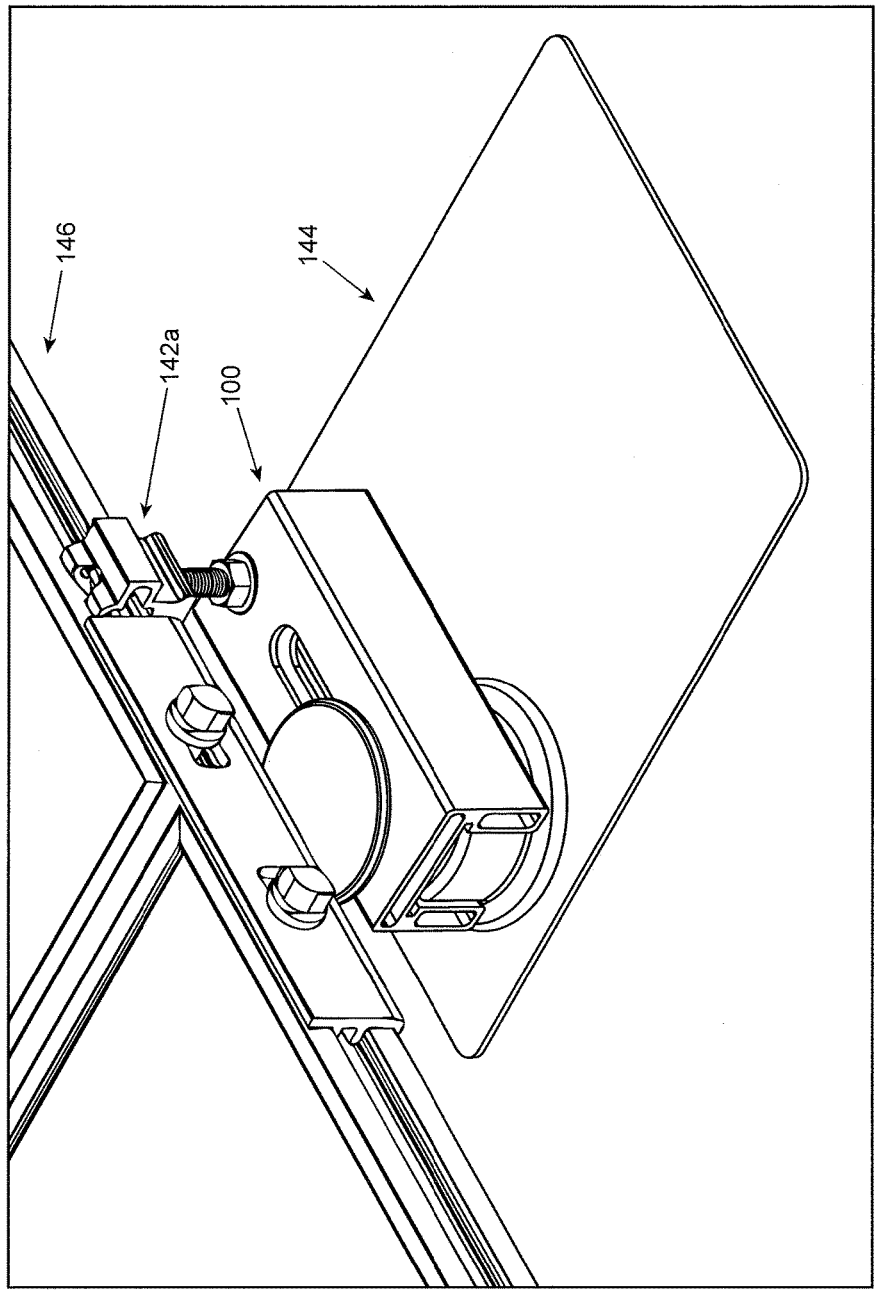

PLUNGER AND PUCK MOUNTING SYSTEM FOR PHOTOVOLTAIC PANELS

BACKGROUND OF THE INVENTION

There are many systems available for mounting photovoltaic (PV) panels to building structures, such as a roof. Such systems serve as a rigid interconnection element between a roof and a PV panel.

While such systems function sufficiently after installation, difficulty during installation can negatively affect worker safety and cause installation delays. Typically, such systems are designed to be adjustable to allow some flexibility between the distance between the mounting point on the roof and the mounting point of the PV panel. Accordingly, one or more bolts are typically used to lock adjustable features to place the system into a rigid state.

The cost of this adjustment capability is greater installation time and additional training needed for the installer. A lengthy time of installation is detrimental to worker safety, because often, installation takes place on elevated and/or pitched roofs; hence, the less time spent on the roof the better. In addition, the installer is required to carry additional tools to install and adjust such systems. Accordingly, it is desirable to provide a PV panel mounting system that helps mitigate such installation issues.

BRIEF SUMMARY OF THE INVENTION

Many embodiments of the invention are directed to a PV mounting system. The system can include a base portion, a foot portion for supporting a PV module frame mounting component, and a plunger. The plunger can pass through the foot portion and selectively couple to the base portion. Application of a downward force on one end of the plunger may compress the plunger towards the base portion to selectively lock the foot portion to the base portion.

In many embodiments, the plunger may include an elongated shaft passing through the foot portion.

In many embodiments, the plunger can selectively couple to the base portion via a latch positioned between the plunger and base portion.

In many embodiments, the latch can include first and second flexible flanges adapted to extend into fixed connection with the base portion.

In many embodiments, the plunger can include first and second extensions that respectively lock the first and second flexible flanges of the latch into the base portion.

In many embodiments, the plunger can include tabs on the shaft that lock the shaft with the latch during compression of the plunger to prevent further movement of the plunger.

Many embodiments of the invention are directed to a photovoltaic (PV) mounting hardware support system. The system can include a base portion for mounting to a roof. A foot can be provided and has an elongated body adapted to connect to at least one PV module frame mounting component. The system can include a latch between the foot and the base portion. The latch can have first and second flexible flanges adapted to extend into fixed connection with the base portion. A plunger can be provided and have first and second extensions. The plunger can be located between the latch and the base portion and moveable from a first position to a second position. In a first position of the plunger, the first and second flexible flanges of the latch are not in fixed connection with the base portion. In the second position of the plunger, the first and second extensions of the plunger respectively apply forces to the first and second flexible flanges such that the first and second flexible flanges are placed into fixed connection with the base portion.

In many embodiments, the base portion can have a lip for the first and second flexible flanges to fixedly connect to.

In many embodiments, the base portion can be a circular puck configured for connection to a lag bolt.

In many embodiments, a bottom portion of the base portion can be configured to mount to a roof flashing.

In many embodiments, the plunger can have an elongated shaft that extends upwardly through a passage in the latch and a slot within the foot.

In many embodiments, the shaft can have a plurality of tabs that are configured to secure to a portion of the latch.

In many embodiments, the shaft can be a rectangular tube.

In many embodiments, the shaft can extend downwardly to a pair of flanges that further extend to a planar base portion.

In many embodiments, the first extension can be one end of the planar base portion, and wherein the second extension can be another end of the planar base portion.

In many embodiments, the first and second extensions can be curved to match a lip of the base portion.

In many embodiments, the planar base portion can include a passage for clearing the head of a lag bolt.

In many embodiments, the latch can have a planar portion horizontally arranged to slide within the foot in the first position of the plunger.

In many embodiments, the planar portion can have a first end and a second end, such that the first flexible flange extends downwardly from the first end and the second flexible flange extends downwardly from the second end.

In many embodiments, in the first position of the plunger the first and second flexible flanges can be shaped with an inward bias towards one another.

In many embodiments, in the first position of the plunger the first and second flexible flanges can be placed in a tensioned state forced against the inward bias by the first and second extensions of the plunger.

In many embodiments, the first extension can push the first flexible flange away from the second flexible flange and into a complimentary first portion of the base portion, and the second extension can push the second flexible flange away from the first flexible flange and into a complimentary second portion of the base portion.

In many embodiments, the elongated body of the foot can be formed as a U-shaped extrusion that is elongated along a first direction and can have channels elongated along the first direction for holding the latch.

In many embodiments, the elongated body of the foot can include at least one elongated slot that a shaft of the plunger can be laterally positioned within.

In many embodiments, the elongated body of the foot can include at least one mounting hole for mounting to the at least one PV module frame mounting component.

In many embodiments, the system can include a lag bolt for mounting the base portion to a roof structure.

In many embodiments, the system can include a washer mounted between the lag bolt and the plunger, with the washer providing a raised surface for the plunger.

In many embodiments, the system can include a cap arranged above the foot and configured to transfer force to the plunger for changing from the first position of the plunger to the second position of the plunger.

Many embodiments of the invention are directed to a photovoltaic (PV) mounting hardware support system having a base portion assembly for mounting to a structure. A foot assembly can be detachably coupled to the base portion assembly. The foot assembly can include a latch configured to fixedly secure to the base portion assembly without any bolts sufficiently to support at least one PV module frame.

In many embodiments, the base portion assembly can include at least a puck.

In many embodiments, the base portion assembly can further include a lag bolt for securing the base portion assembly to a roof structure.

In many embodiments, the base portion assembly can further include a flashing configured to mount between the puck and the roof structure.

In many embodiments, the latch can include a pair of flanges, and the foot assembly further can include a plunger for pushing the pair of flanges into the puck.

In many embodiments, downward movement of the plunger fixedly secures the foot assembly to the base portion assembly.

In many embodiments, the foot assembly can include a cap coupled to the plunger, such that downward force placed upon the cap causes the downward movement of the plunger.

In many embodiments, the foot assembly can include a PV module frame mounting component.

In many embodiments, the foot assembly can include a plurality of preassembled components and is provided with the base portion assembly within a kit.

BRIEF DESCRIPTION OF THE DRAWINGS

FIGS. 3A-3D show the system of FIG. 1A in use, according to various embodiments of the invention.

DETAILED DESCRIPTION OF THE INVENTION

Embodiments of the invention are generally directed towards a system for mounting a PV panel to a support structure such as a roof surface. The system can include a base portion assembly and a foot assembly for supporting a PV panel. The foot assembly may include a moveable latch that when moved into a fixed position with the base portion assembly, provides a boltless system for rigidly fixing the foot assembly to the base portion assembly in a sufficient manner to permanently support the weight of one or more PV panels. Advantageously, such as system requires little to no tools for installation, and hence installation time is greatly reduced over prior systems that require additional tools and bolting. The following description details some examples of such a system.

Figure 1A:
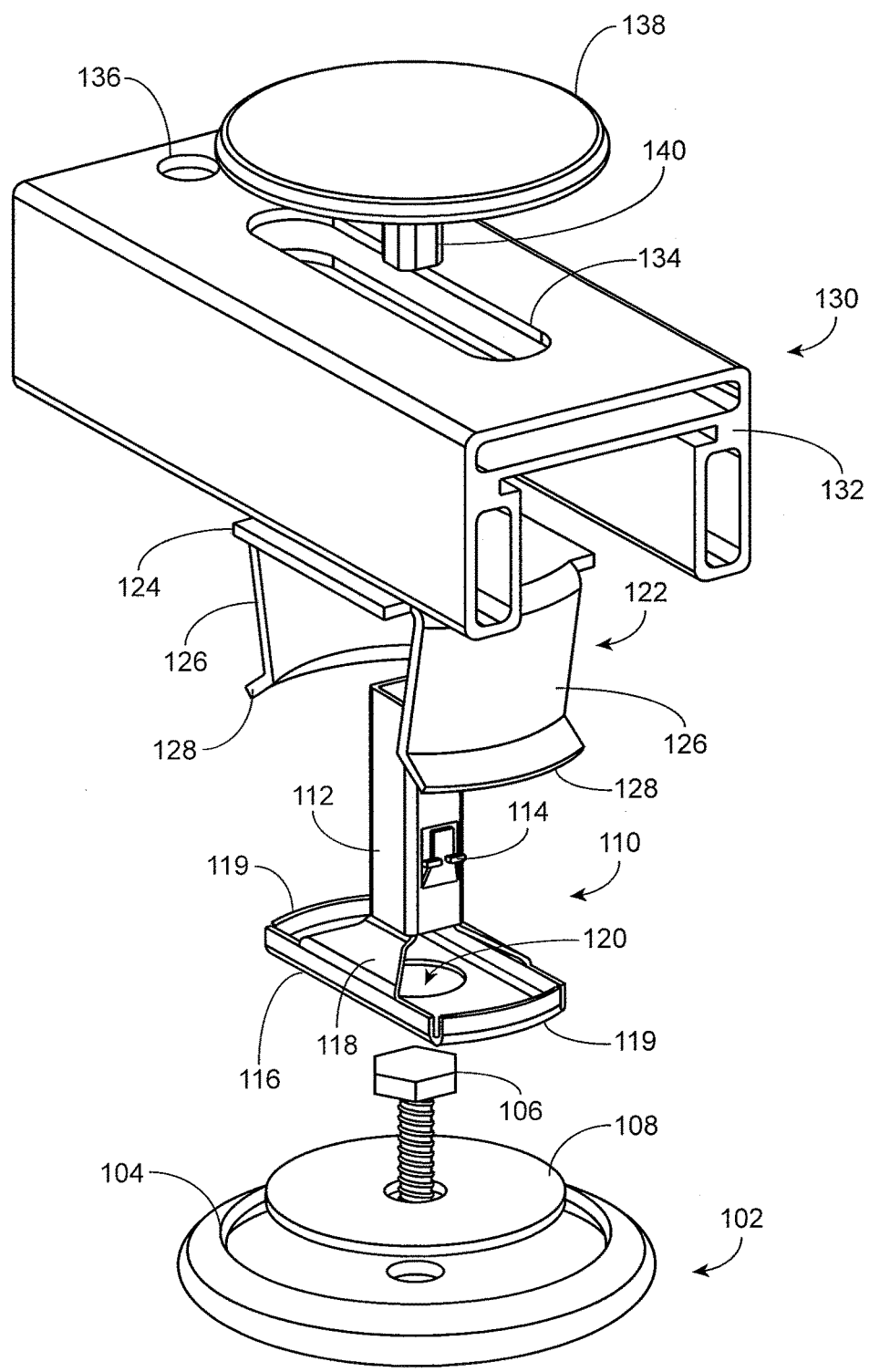
FIG. 1A shows an exploded perspective view of an exemplary PV mounting system, according to an embodiment of the invention.
Figure 1B:
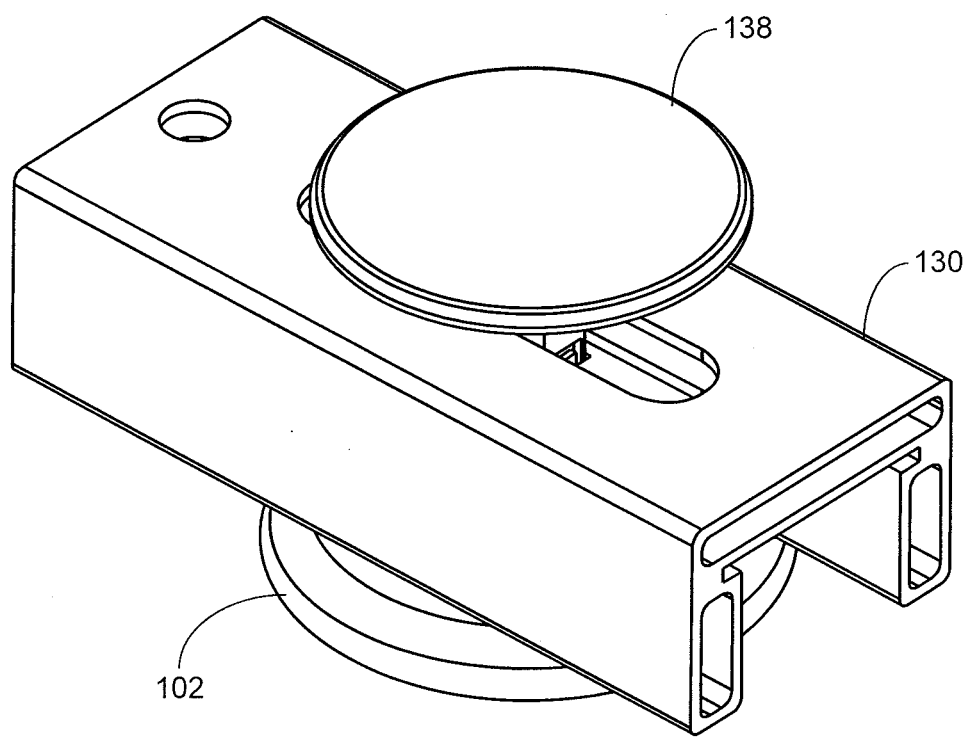
FIG. 1B shows an assembled perspective view of the system of FIG. 1A.

FIGS. 1A and 1B respectively show assembled and exploded views of an exemplary system 100 for mounting a PV panel to a structure, such as a roof. The system 100 includes a base portion 102, which here is formed as a puck having an inner lip 104. The base portion 102 has a lower surface that is configured to directly or indirectly mount to a structure, and can include one or more passages for mounting the base portion 102 via a lag bolt 106 and washer 108. In some embodiments, the washer 108 is not used or functionally integrated into the shape of the base portion 102 as a raised surface. The base portion is not limited to puck-like design, for example, the inner lip 104 may be integrated into a flashing or specialized shingle to provide the functionality of the base portion 102 in a different form.

In the exemplary system 100 of FIGS. 1A, and 1B, situated above the base portion 102 is a plunger 110 having a shaft 112. The shaft 112 has a rectangular cross-section, but is not limited to such a shape, and may for example have a circular or hexagonal cross-section. The shaft 112 includes one or more tabs 114 that extend in lateral directions. The shaft 112 leads to a planar base portion 116 by way of a pair of flanges 118. The planar base portion 116 has first and second extensions 119 leading laterally away from the shaft 112, as well as a passage 120 to provide clearance for the head of the lag bolt 106. The first and second extensions 119 can be curved to match the profile of the lip 104 of the base portion 102 and/or the flanges of the latch described below.

The system 100 also includes a latch 122. The latch 122 has an uppermost planar portion 124 and a pair of first and second flexible flanges 126 that lead downwardly from ends of the planar portion 124. The first and second flexible flanges 126 include edges 128 that are complimentary shaped (e.g. rounded) to fit into the inner lip 104 of the base portion 102. However, the first and second flexible flanges 126 are biased inwardly such that the edges 128 have a smaller diameter than the inner diameter of the inner lip 104. The planar portion 124 also includes a passage (not shown in these views) for allowing the shaft 112 of the plunger 110 to pass through.

Above the latch 122 is positioned a foot 130, which is configured as an elongated U-shaped body having multiple walls. The planar portion 124 of the latch 122 is configured to slide into elongated channels 132 on an underside of the foot 130. The foot 130 includes a passage, which can be an elongated slot 134 for allowing the shaft 112 of the plunger 110 to pass through. The foot 130 also includes one or more passages 136 for enabling connection to at least one PV module frame mounting component.

An optional cap 138 is positioned on top of the foot 130. The cap 138 includes a cap shaft 140 that is configured to mate with the shaft 112 of the plunger 110.

Figure 2A:
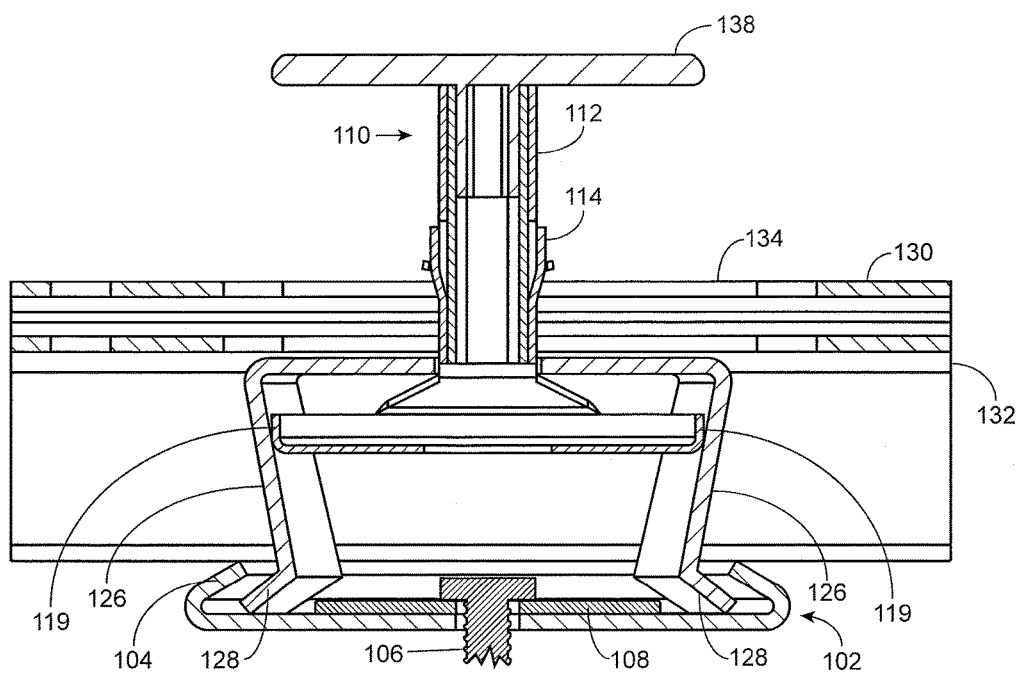
FIGS. 2A and 2B show cross-sectional views of the system of FIG. 1A.
Figure 2B:
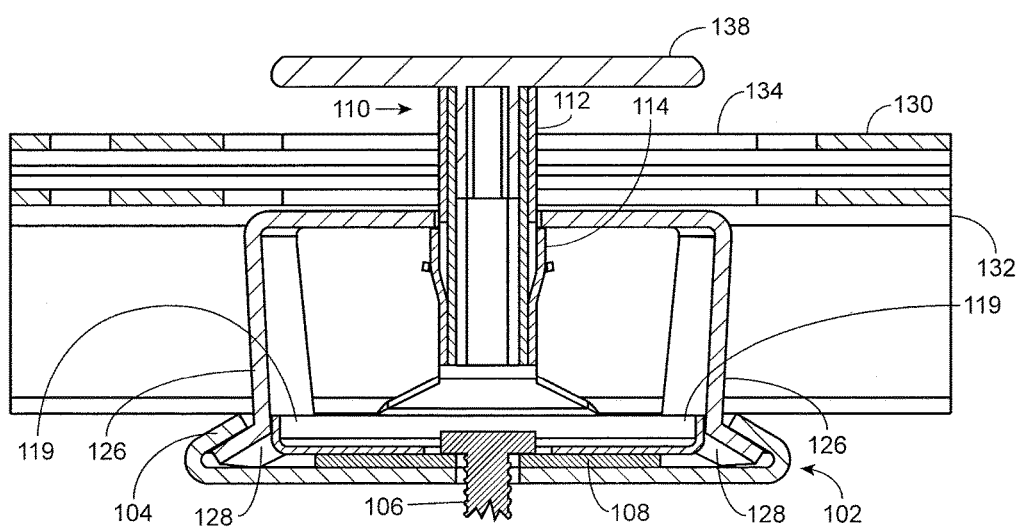

FIGS. 2A and 2B show cross-sectional views of the system 100. The base portion 102, lag bolt 106, and washer 108 are typically installed first as a base portion assembly. This is performed by drilling a suitable sized hole into a structure and then bolting the lag bolt 106 into the drilled hole over the washer 108 and base portion 102.

The cap 138, foot 130, latch 122, and plunger 110 can be preassembled as a foot assembly shown at FIG. 2A. To form the foot assembly, the planar portion 124 of the latch 122 is slid into the channels 132 of the foot 130. The plunger 110 is then inserted within the latch 122 such that the first and second extensions 119 fit within the first and second flexible flanges 126 and so that the shaft 112 extends upwardly through the passage of the latch 122 and the channel 134 of the foot 130. The cap 138 is then attached to the shaft 112. In some embodiments, the foot assembly is preassembled with its requisite components and provided with the components of the base portion assembly as a complete installation kit. Hence, the installer does not need to assemble the foot assembly in the field.

In use, the foot assembly is placed onto the installed base portion assembly as shown at FIG. 2A, such that the edges 128 of the first and second flexible flanges 126 are placed within the lip 104 of the base portion 102 and such that the plunger 110 remains in an elevated first position. The elongated slot 134 of the foot 130 allows for flexibility in placing the foot with respect to the base portion 102. In the position show at FIG. 2A, the first and second flexible flanges 126 are not in fixed connection with the lip 104 of the base portion 102.

Downward force is then applied to the cap 138, for example by stepping on it or by using a mallet. This causes the plunger 110 to travel down to a second position such that the planar base portion 116 meets the washer 108. As the plunger 110 travels downward, the first and second extensions 119 expand the first and second flexible flanges 126 outwardly. When the plunger 110 reaches the washer 108 the edges 128 of the first and second flexible flanges 126 are forcibly wedged into the lip 104 of the base portion 102. Accordingly, the first and second extensions 119 of the plunger 110 respectively apply forces to the first and second flexible flanges 126 such that the first and second flexible flanges 126 are placed into fixed connection with the base portion 102.

The tabs 114 of the shaft 112 extend laterally to prevent the bias of the first and second flexible flanges 126 from pushing the plunger 110 upward. The resulting configuration places the system 100 into a rigid configuration with respect to the structure the base portion 102 is affixed to, without requiring the use of any bolts aside from the lag bolt 106. This un-bolted configuration allows the foot to have enough structural rigidity to support one or more PV panels.

Generally, the system 100 is intended to be provide a permanent installation hard point for at least one PV module frame mounting component, and accordingly due to the tabs 114, once placed into the position shown at FIG. 2B cannot be removed without damaging the system 100. However, in some embodiments, the tabs 114 of the plunger 110 can be accessed to release the plunger 110 and place the system 100 back into the form shown at FIG. 2A. Accordingly, in some embodiments, the shaft 112 of the plunger 110 can be rotatable so that turning the shaft 112 causes the tabs 114 to be exposed to a wider portion of the passage within the latch 122, and hence upon doing so lose contact with the latch 122 so that the plunger 110 can be pulled upward. In other embodiments, the first and second flexible flanges 126 of the latch 122 can have openings to allow access of a tool to push the tabs 114 inward so that the plunger 110 can be pulled upward. In some embodiments, the cap 138 is not used or is removable such that a tool can be used to access and release the tabs 114 through the shaft 112 of the plunger 110. In some embodiments, the cap 138 is not used or is removable to access the lag bolt 106 through the shaft 112 of the plunger 110, for removal of the entire system 100 from a structure.

Figure 3A:
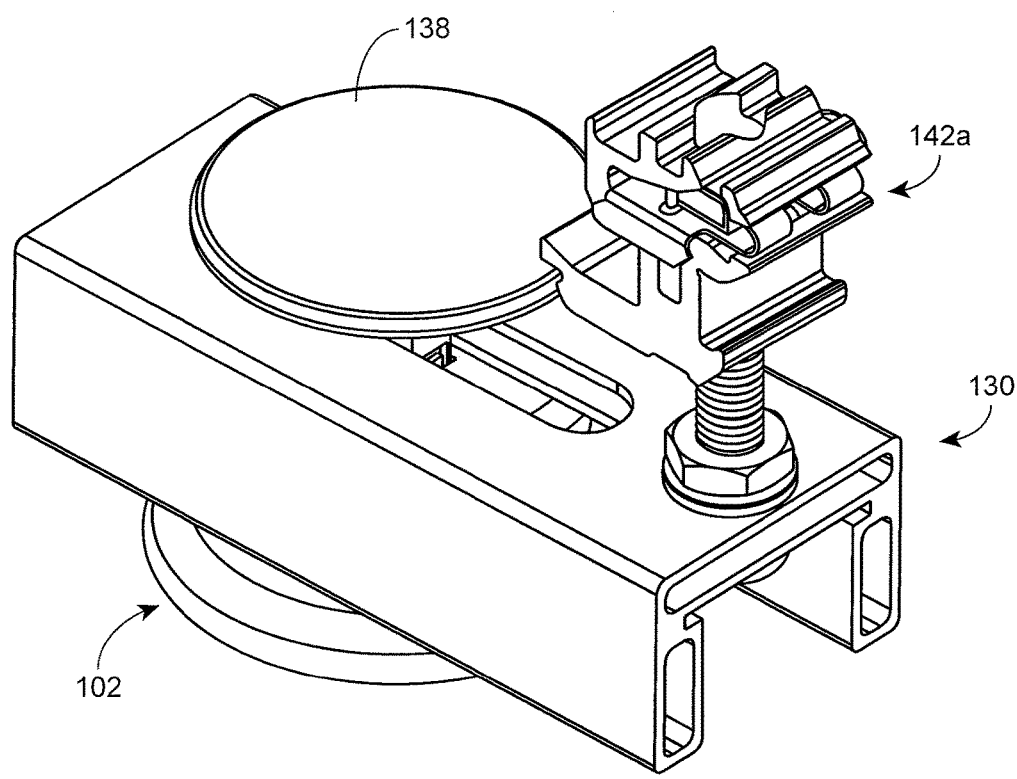
Figure 3B:
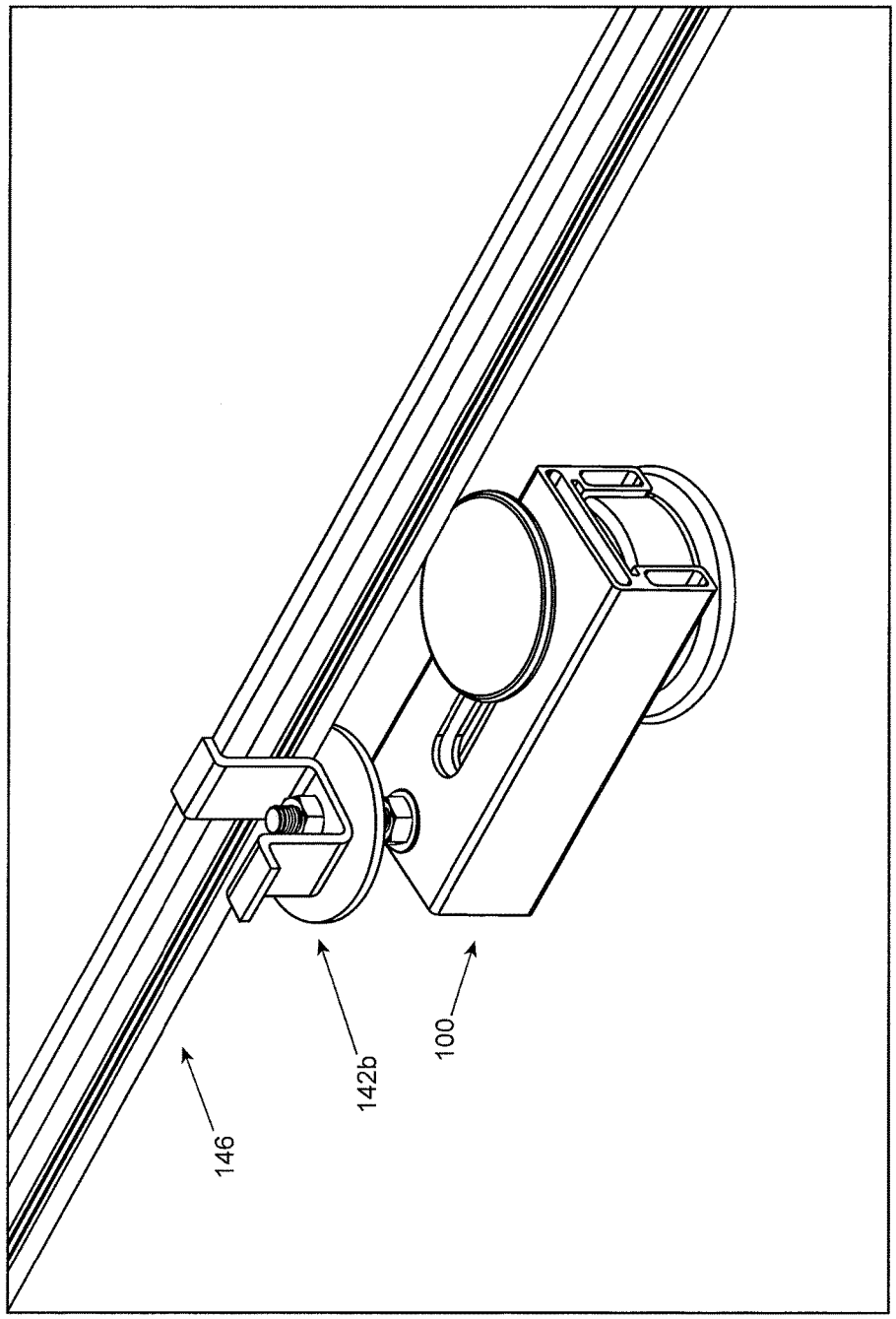

FIG. 3A shows the system 100 with a PV module frame mounting component 142 attached to the foot 130. The PV module frame mounting component 142a is depicted simply as a threaded stud and frame mounting component, but many different types of PV module frame mounting components can be used instead. For example, various embodiments of the invention may utilize a clamping style connector 142b such as that shown in FIG. 3B. In some embodiments, the PV module frame mounting component 142a is preassembled to the foot 130 with the foot assembly shown at FIGS. 2A and 2B.

Figure 3D:
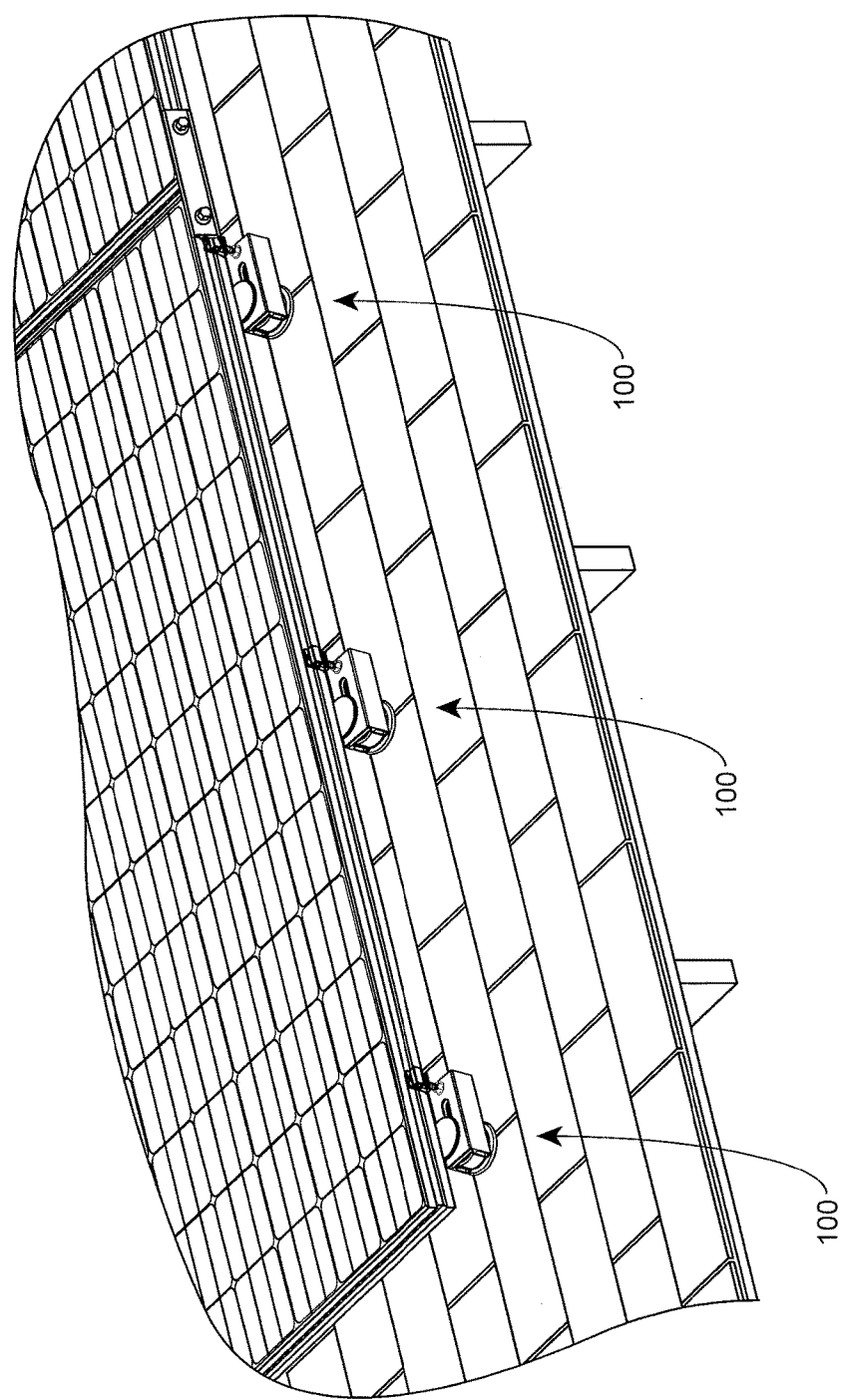

FIG. 3C shows the system 100 assembled to a roof flashing 144. The lower surface of the base portion 102 can be shaped to attach to a variety of different types of flashings such as the flat flashing shown. In some embodiments, the roof flashing is preassembled to the base portion 102 with the base portion assembly shown at FIGS. 2A and 2B. In addition, the system 100 is connected to a PV module frame 146 via the PV module frame mounting component 144. It should be appreciated, however, that in various embodiments, the base portion 102 may be mounted directly to a roof surface without use of flashing 144. Such embodiments may be advantageous because they rely on fewer materials, are faster to install, and permit the installer to install the base portions 102 while he or she is moving through the array installation, as opposed to laying all the base portions 102 out before hand—a step typically required when flashings are used. FIG. 3D shows a plurality of systems 100 used to connect an array of a PV module frames 146, without the optional flashing.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A photovoltaic (PV) mounting system comprising:
a base portion;
a foot portion for supporting a PV module frame mounting component; and a plunger passing through the foot portion and selectively coupling to the base portion, wherein application of a downward force on one end of the plunger compresses the plunger towards the base portion to selectively lock the foot portion to the base portion, wherein the plunger comprises an elongated shaft passing through the foot portion, wherein the plunger selectively couples to the base portion via a latch positioned between the plunger and base portion, and wherein the latch comprises first and second flexible flanges adapted to extend into fixed connection with the base portion.

2. The PV mounting system of claim 1, wherein the plunger comprises first and second extensions that respectively lock the first and second flexible flanges of the latch into the base portion.

3. The PV mounting system of claim 2, wherein the plunger comprises tabs on the shaft that lock the shaft with the latch during compression of the plunger to prevent further movement of the plunger.

4. A photovoltaic (PV) mounting hardware support system comprising:
a base portion for mounting to a structure;
a foot having an elongated body adapted to connect to at least one PV module frame mounting component;
a latch between the foot and the base portion and comprising first and second flexible flanges adapted to extend into fixed connection with the base portion;
a plunger having first and second extensions, the plunger being located between the latch and the base portion and moveable from a first position to a second position, wherein the plunger comprises an elongated shaft that extends upwardly through a passage in the latch and a slot within the foot and the shaft extends downwardly to the first and second extensions that further extend from a plunger planar portion,
wherein in the first position of the plunger, the first and second flexible flanges of the latch are not in fixed connection with the base portion, and
wherein in the second position of the plunger, the first and second extensions of the plunger respectively apply forces to the first and second flexible flanges such that the first and second flexible flanges are placed into fixed connection with the base portion.

5. The PV mounting hardware support system of claim 4, wherein the base portion comprises a lip for the first and second flexible flanges to fixedly connect to.

6. The PV mounting hardware support system of claim 4, wherein the latch comprises a latch planar portion having a first end and a second end, wherein the first flexible flange extends downwardly from the first end and wherein the second flexible flange extends downwardly from the second end.

7. The PV mounting hardware support system of claim 4, further comprising a cap arranged above the foot and configured to transfer force to the plunger for changing from the first position of the plunger to the second position of the plunger.

8. A photovoltaic (PV) mounting hardware support system comprising:
a base portion for mounting to a structure;
a foot having an elongated body adapted to connect to at least one PV module frame mounting component;
a latch between the foot and the base portion and comprising first and second flexible flanges adapted to extend into fixed connection with the base portion;
a plunger having first and second extensions, the plunger being located between the latch and the base portion and moveable from a first position to a second position,
wherein in the first position of the plunger, the first and second flexible flanges of the latch are not in fixed connection with the base portion, and
wherein in the second position of the plunger, the first and second extensions of the plunger respectively apply forces to the first and second flexible flanges such that the first and second flexible flanges are placed into fixed connection with the base portion,
wherein the elongated body of the foot comprises a U-shaped extrusion elongated along a first direction and having channels elongated along the first direction for holding the latch.

9. A photovoltaic (PV) mounting hardware support system comprising:
a base portion assembly for mounting to a structure;
a foot assembly detachably coupled to the base portion assembly;
wherein the foot assembly comprises a latch configured to fixedly secure to the base portion assembly without any bolts sufficiently to support at least one PV module frame,
wherein the latch comprises a pair of flanges, and the foot assembly further comprises a plunger for pushing the pair of flanges into the base portion assembly.

10. The PV mounting hardware support system of claim 9, wherein the base portion assembly comprises at least a circular housing.

11. The PV mounting hardware support system of claim 10, wherein the base portion assembly further comprises a lag bolt for securing the base portion assembly to a roof structure.

12. The PV mounting hardware support system of claim 11, wherein the base portion assembly further comprises a flashing configured to mount between the circular housing and the roof structure.

13. The PV mounting hardware support system of claim 9, wherein downward movement of the plunger fixedly secures the foot assembly to the base portion assembly.

14. The PV mounting hardware support system of claim 9, wherein the foot assembly comprises a plurality of pre-assembled components and is provided with the base portion assembly within a kit.

* * * * *